United States Patent
Jiang et al.

[11] Patent Number: 5,353,640
[45] Date of Patent: Oct. 11, 1994

[54] AIR-JET DRIVEN DYNAMIC BALANCE TEST APPARATUS

[75] Inventors: Wen-Wang Jiang, San Chung; Shih-Chou Chen; Chang-Ming Chen, both of Hsinchu, all of Taiwan

[73] Assignee: Industrial Technology Research Institute, Hsinchu, Taiwan

[21] Appl. No.: 56,667

[22] Filed: May 3, 1993

[51] Int. Cl.⁵ .............................................. G01M 1/00
[52] U.S. Cl. ......................................... 73/471; 73/460
[58] Field of Search ................. 73/460, 462, 471, 472, 73/474

[56] References Cited

U.S. PATENT DOCUMENTS

| | | |
|---|---|---|
| 4,467,649 | 8/1984 | Mueller ................................. 73/462 |
| 4,543,825 | 10/1985 | Schönfeld .......................... 73/472 X |
| 5,067,349 | 11/1991 | Hirchert ................................. 73/472 |

*Primary Examiner*—Thomas P. Noland
*Assistant Examiner*—Christine K. Oda
*Attorney, Agent, or Firm*—W. Wayne Liauh

[57] ABSTRACT

An air-jet driven dynamic balance test apparatus for testing the dynamic balance of minrotors with minimum interference from external vibration noise. The dynamic balance test apparatus comprise a resilient supporting steel sheet having a horizontal bottom portion fastened to a base and an elongated upright body portion extended upwardly from the horizontal bottom portion to carry the sample to be tested. An air-jet generating device is provided to produce a continuous stream of compressed air for rotating the sample about its central axis. The resilient supporting steel sheet contains a resilient section for increasing sensitivity of said test apparatus. The resilient supporting steel sheet contains a resilient section, which can be the resilient steel sheet itself or in the form of a row of through holes or a corrugated section. A detector is mounted on the resilient supporting steel sheet to detect the vibration as the sample is being rotated during testing. An electromagnetic valve and a pressure regulating valve connected to an I/O interface of a master computer can be provided to automatically regulate the pressure of the continuous stream of the compressed air so as to control the revolving speed of the sample being tested at a predetermined constant rotation speed.

7 Claims, 3 Drawing Sheets

PRIRO ART

AIR-JET DRIVEN DYNAMIC BALANCE TEST APPARATUS

BACKGROUND OF THE INVENTION

The present invention relates to dynamic balance machines, and relates more specifically to an air-jet driven dynamic balance test apparatus for testing the dynamic balance of mini rotors which eliminates the interference of external vibration noise.

A variety of mini motors or rotors are known, and widely used in digitized recorders, video tape players and recorders, laser disc drivers, computer diskdrives, laser printers, etc. In order to obtain a satisfactory quality, a mini motor or motor should be tested for its dynamic balance before use. FIG. 1 illustrates a dynamic balance test apparatus according to the prior art, which comprises two rigid upright supports, on which the axle 11 of the rotor 10 to be tested is supported, a motor drive 16, a coupler 15 which couples the axle 11 of the rotor 10 to be tested to the output shaft of the motor drive, 16, and a vibration detector 14 mounted on each rigid upright support. As the motor drive 16 is started, the vibration detector 14 detects the vibration of the upright support and sends a signal to a micro processor unit for analysis and display. During the operation of the dynamic test apparatus, the motor drive 16 may produce a vibration noise to interfere with the detection of the vibration detector 14. Further, because the vibration detector is mounted on a rigid upright support, it cannot detect a weak vibration signal produced by a very small being tested, i.e., this structure of dynamic balance test apparatus provides low sensitivity.

SUMMARY OF THE INVENTION

The present invention has been accomplished to overcome the aforesaid drawbacks. The present invention uses a resilient supporting steel sheet to carry the sample to be tested, so that any weak vibration of the sample can be transmitted to the vibration detector mounted thereon. An air compressor or the like and an air accumulator are used to produce a continuous stream of compressed air through a nozzle jet for turning the sample to be tested, and therefore no vibration noise is produced during the test.

DETAILED DESCRIPTION OF THE PREFERRED EMBODIMENT

Figure 1:
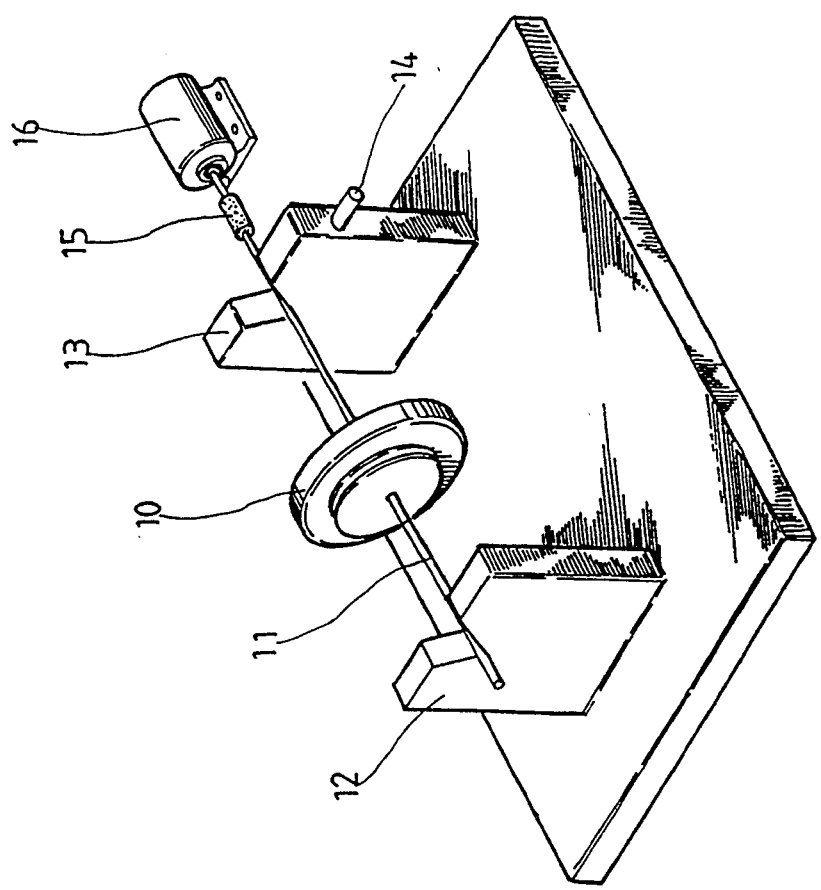
FIG. 1 is a schematic drawing showing the arrangement of a dynamic balance test apparatus according to the prior art.
Figure 2:
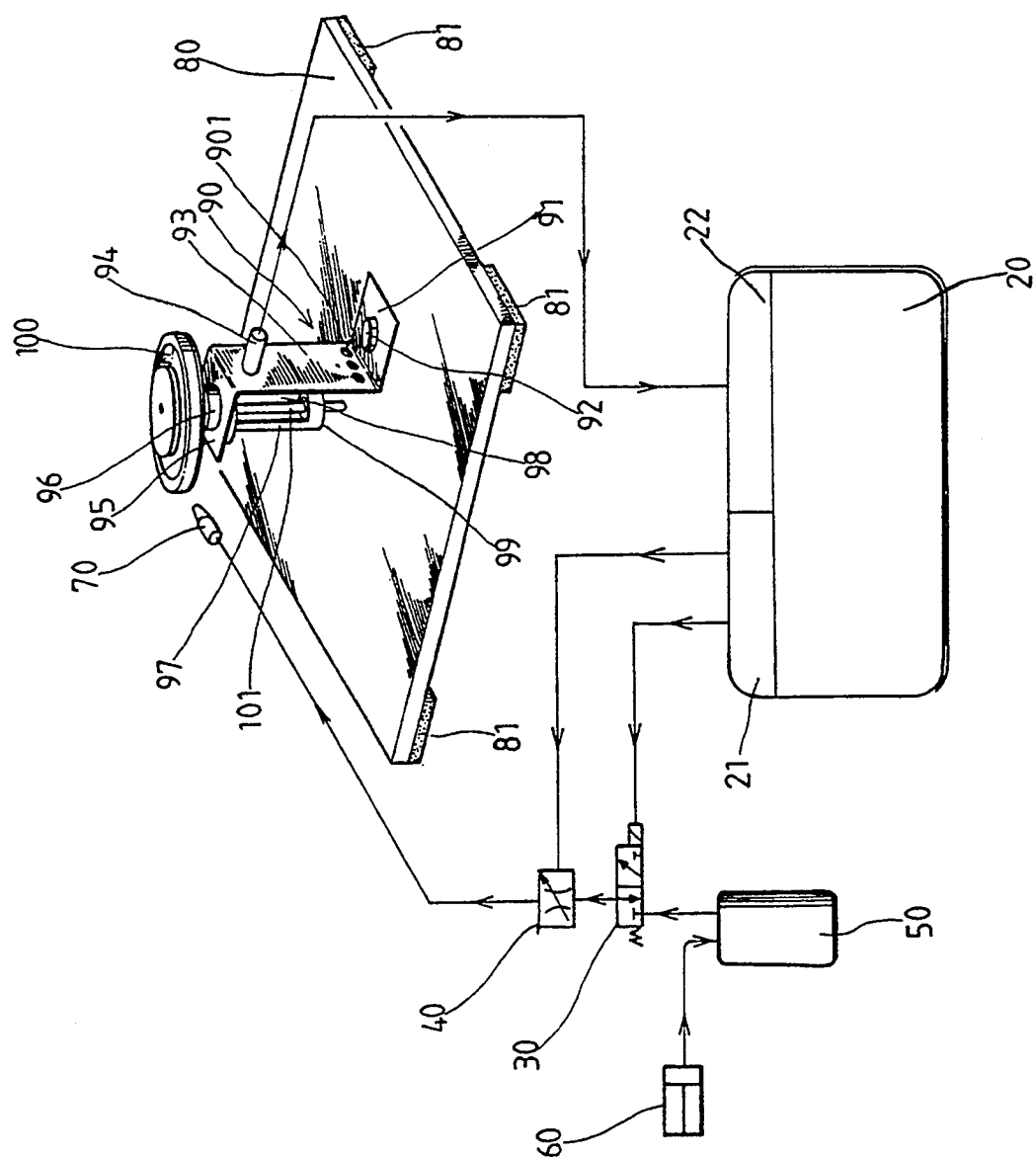
FIG. 2 is a schematic drawing showing the arrangement of a dynamic balance test apparatus according to the present invention.
Figure 3:
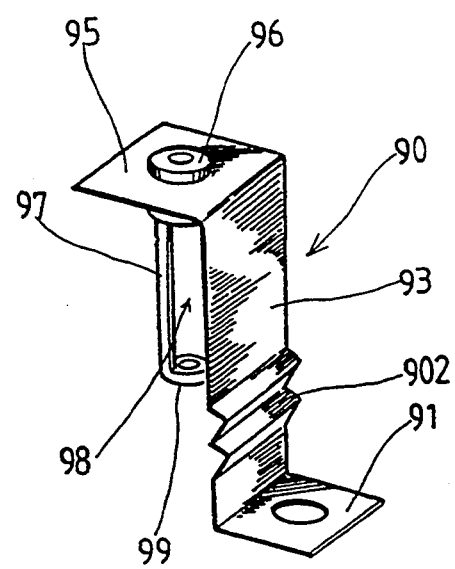
FIG. 3 is a perspective view of an alternate form of the resilient supporting steel sheet.

Referring to FIG. 2, the apparatus comprises a master computer 20 having an I/O interface 21 and a signal collecting interface 22. Through the I/O interface 21, an electromagnetic valve 30 and a pressure regulating valve 40 are controlled by the master computer 20. An air accumulator 50 and an air compressor or the like 60 are arranged and controlled to give the necessary pneumatic pressure for turning the sample 100 to be tested. A nozzle jet 70 is connected to the air accumulator 50 through the pressure regulating valve 40 and the electromagnetic valve 30, and disposed toward the periphery of the sample 100 to be tested. A base 80 is supported on shock-absorbing foot pads 81 to hold a resilient supporting steel sheet 90 at the top in its center. The resilient supporting steel sheet 90 is made in the shape of a strap anchor (having a substantially Z-shaped profile) including a horizontal bottom section 91 fastened to the base 80 by a screw 92, a horizontal top section 95 having a bearing block 96 for holding the sample 100 to be tested, a vertical intermediate section 93 connected between the bottom section 91 and the top section 95 to which a vibration detector 94 is fastened. The vibration detector 94 is connected to the master computer 20 through the signal collecting interface 22.

Referring to FIG. 2 again, the axle 101 of the sample 100 to be tested is fastened to the bearing block 96 on the horizontal top section 95 of the resilient supporting steel sheet 90. In order to hold the axle 101 of the sample 100 to be tested tightly, an axle holder 97 may be fastened to the resilient supporting steel sheet 90 below the horizontal top section 95. The axle holder 97 defines an internal space 98. The axle holder has a hole (not shown) on a bottom wall 99 thereof into which the end of the axle 101 inserts.

As a stream of air is being continuously driven out of the jet 70, the sample 100, is spinned about its central axis. By means of controlling the pressure regulating valve 80, the revolving speed of the rotor 100 is adjusted. By means of the operation of the air accumulator 50, a stream of compressed air is driven out of the jet 70 at a constant pressure. During the rotary motion of the rotor 100, the vibration detector 94 detects the vibration of the vertical intermediate section 93, and sends the signal to the signal collecting interface 22 of the master computer 20. If the rotor 10 is tested to be unbalanced, the amount of unbalance and its location are rapidly and accurately shown through the monitor of the master computer.

Because the vibration caused by the sample 100 is mainly distributed through the vertical intermediate section 93, the sample to be tested (if it is as small as a 1-inch mini fan) may be directly mounted on the vertical intermediate section 93.

Referring to FIG. 2 again, a transverse row of holes 901 may be made on the vertical intermediate section 93 at the bottom to increase its flexibility, so that the sensitivity of the test apparatus is relatively increased. Instead of the transverse row of holes 901, a corrugated portion 902 may be formed on the vertical intermediate section 93 to achieve the same effect.

Because the sample to be tested is driven by a continuous jet of compressed air, the interference of external vibration noise is eliminated. Because the present invention uses a resilient supporting steel sheet to carry the sample to be tested, any small amount of vibration caused by the sample can be accurately detected by the vibration detector mounted on the resilient supporting steel sheet, and therefore the present invention provides a high sensitivity.

While only a few embodiments of the present invention have been shown and described, it will be understood that various modifications and changes could be made without departing from the spirit and scope of the invention.

What is claimed is:

1. A dynamic balance test apparatus comprising:

a resilient supporting steel sheet having a horizontal bottom portion fastened to a base and an elongated upright body portion extended upwardly from the horizontal bottom portion of carry a sample to be tested, an air-jet generating device controlled to produce a continuous stream of compressed air for spinning the sample mounted on said resilient supporting steel sheet, and detector means mounted on said resilient supporting steel sheet to detect the vibration as the sample is being spun, wherein said resilient supporting steel sheet containing a resilient section for increasing sensitivity of said test apparatus, and said resilient section comprising at least one through hole in the upright body portion of said resilient supporting steel sheet near the intersection between the horizontal bottom portion and the upright body portion.

2. The dynamic test apparatus of claim 1 wherein said resilient supporting steel sheet comprises a horizontal top portion having a bearing block at its top and an axle holder at its bottom for carrying the sample to be tested.

3. The dynamic balance test apparatus of claim 1 wherein said resilient section comprises a corrugated portion in the upright body portion of said resilient supporting steel sheet near the intersection between the horizontal bottom portion and the upright body portion.

4. A dynamic balance test apparatus comprising:
a resilient supporting steel sheet having a horizontal bottom portion fastened to abase and an elongated upright body portion extended upwardly from the horizontal bottom portion to carry a sample to be tested, an air-jet generating device having a nozzle jet spaced from the periphery of the sample to be tested and controlled to produce a continuous stream of compressed air for spinning the sample after said sample is mounted on said resilient supporting steel sheet, a vibration detector mounted on said resilient supporting steel sheet and connected to a signal collecting interface of a master computer, wherein, said air-jet generating device comprising an electromagnetic valve and a pressure regulating vale connected to an I/O interface of said master computer and controlled to regulate the pressure of the continuous stream of the compressed air being drawn out of said nozzle jet so as to regulate the revolving speed of the sample to be tested, wherein the upright body portion of said resilient supporting steel sheet has at least one through hole near the intersection between the horizontal bottom portion and the upright body portion.

5. The dynamic balance test apparatus of claim 4 wherein said resilient supporting steel sheet further comprises a horizontal top portion having a top and a bottom, said top portion having a bearing block at the top and an axle holder at the bottom for carrying the sample to be tested.

6. A dynamic balance test apparatus comprising:
a resilient supporting steel sheet having a horizontal bottom portion fastened to a base and an elongated upright body portion extended upwardly from the horizontal bottom portion to carry a sample to be tested, an air-jet generating device having a nozzle jet spaced from the periphery of the sample to be tested and controlled to produce a continuous stream of compressed air for spinning the sample after said sample is mounted on said resilient supporting steel sheet, a vibration detector mounted on said resilient supporting steel sheet and connected to a signal collecting interface of a master computer, wherein, said air-jet generating device comprising an electromagnetic valve and a pressure regulating valve connected to an I/O interface of said master computer and controlled to regulate the pressure of the continuous stream of the compressed air being drawn out of said nozzle jet so as to regulate the revolving speed of the sample to be tested, wherein the upright body portion of said resilient supporting steel sheet has a corrugated portion near the intersection between the horizontal bottom portion and the upright body portion.

7. The dynamic balance test apparatus of claim 6 wherein said resilient supporting steel sheet further comprises a horizontal top portion having a top and a bottom, said top portion having a bearing block at the top and an axle holder at the bottom for carrying the sample to be test.

* * * * *